Feb. 3, 1942. P. J. IMSE ET AL 2,272,118
SELF-ALIGNING BEARING
Filed June 6, 1939
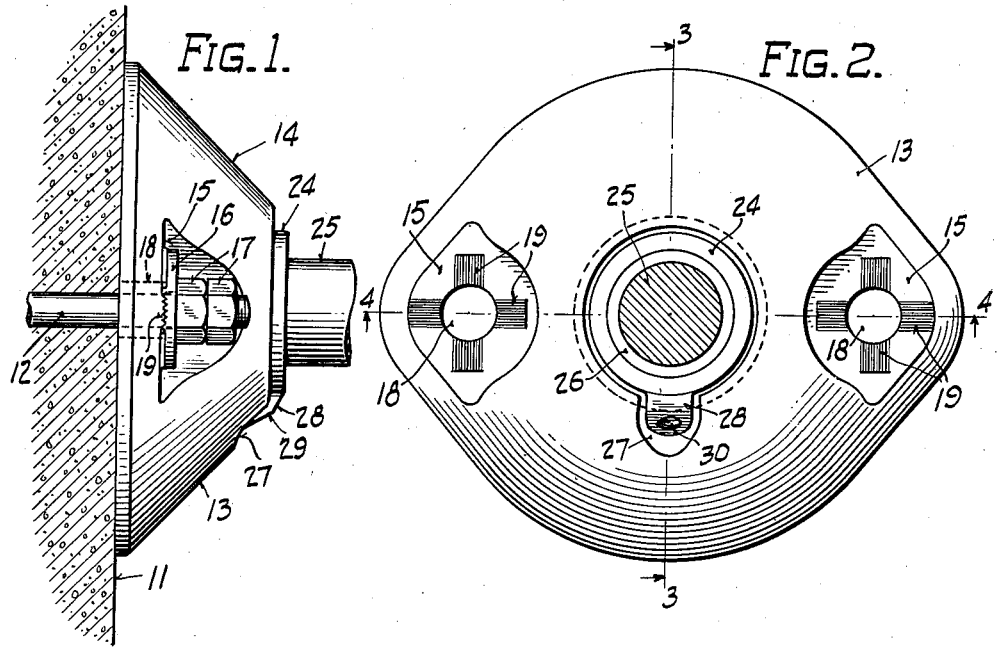
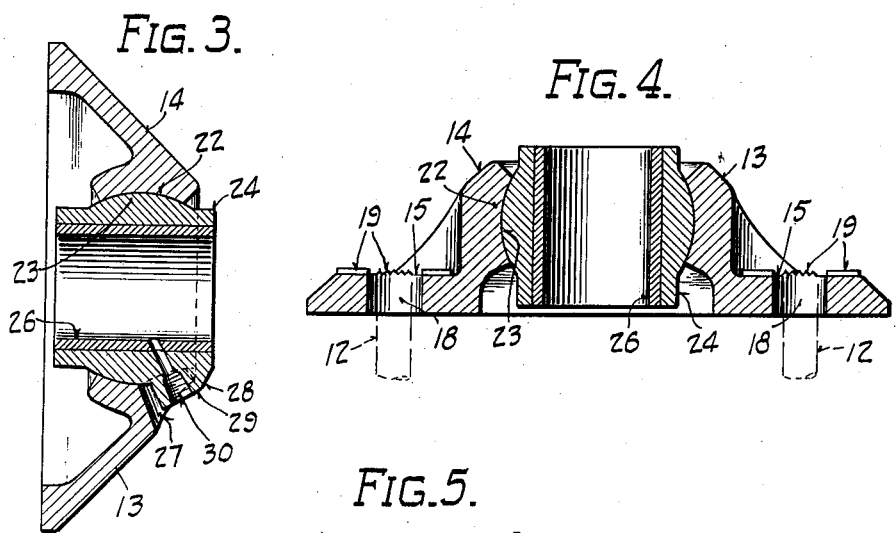
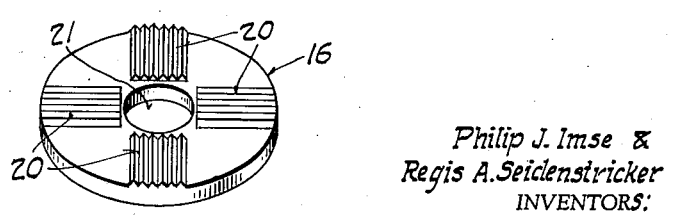
Philip J. Imse &
Regis A. Seidenstricker
INVENTORS:
BY George A. Evans
ATTORNEY.

Patented Feb. 3, 1942

2,272,118

UNITED STATES PATENT OFFICE 2,272,118

SELF-ALIGNING BEARING

Philip J. Imse and Regis A. Seidenstricker, Milwaukee, Wis., assignors to Chain Belt Company, Milwaukee, Wis., a corporation of Wisconsin Application June 6, 1939, Serial No. 277,699

1 Claim. (Cl. 308—72)

This invention relates to a bearing which may be used with shafts in sewage disposal apparatus such as sludge collectors or sludge removers. Such shafts are submerged in liquid containing sewage and other settleable solids and are journalled in bearings mounted on the side walls of the collecting tank, the shafts controlling the movements of conveyor equipment removing the settleable material. Because of the putrescible nature of the settleable matter, it is highly important to eliminate all surfaces in the tank upon which such matter may collect, other than those which are cleaned by the collecting mechanism. Accordingly, it is an object of the present invention to provide a bearing so designed and adapted to fit against the side wall of the tank that a minimum of putrescible matter may collect thereon.

It is customary to construct the walls of such tanks of concrete and to embed therein studs or bolts for attaching the bearings. It frequently occurs, however, that such studs are not properly disposed or spaced for the accommodation of cooperating holes in the bearings and also that the attached bearings on opposing walls of the tank are not in alignment due to misplacement of the supporting studs. The resulting difficulties in the installation of equipment will be readily understood.

Another object of the present invention is to provide a universal bearing for the purposes described which may be adjusted to engage projecting bolts on the tank walls possibly displaced from their intended position, and which will permit alignment between bearings disposed at opposite sides of the tank.

In providing a bearing to accomplish the foregoing object, provision must be made to eliminate the collection of putrescible matter on the bearing and hence it is a further object of the invention to provide a universal adjustable bearing which will satisfactorily prevent the collection of such matter.

More specifically, one of the objects is to provide a universal bearing having an integral socket member of generally conical exterior shape and an internal socket for retaining the shaft bearing in desired axial alignment.

These and other objects of the invention will be more fully explained in the following description and by the accompanying drawing, in which:

Fig. 1 is a side elevation of the bearing.

Fig. 2 is a front elevation of the bearing shown in Fig. 1;

Fig. 3 is a sectional view of the bearing taken along the line 3—3 of Figure 2;

Fig. 4 is a sectional view taken along the line 4—4 of Fig. 2; and

Fig. 5 is an enlarged perspective view of the washer engaging the bearing.

The number 11 on the drawing designates the vertical wall of the settling tank in which are embedded bolts or studs 12 which extend at right angles from the wall and support the socket 13. The external surface 14 of the socket member 13 is generally conical or frusto-conical with respect to the bearing axis and the end portion is designed to lie flat against the wall 11 of the receptacle. In the drawing, the conical surface slopes at any angle of approximately 45 degrees from the horizontal. Any angle may be selected however, provided it affords sufficient slope to prevent the accumulation of settleable matter on the bearing. This conical surface 14 is recessed at the side portions to provide seats 15 which co-operate with washers 16 arranged between the seats 15 and nuts 17 engaging threaded extensions of the bolts 12.

Holes 18 are provided through the socket at right angles to the rear face and generally in a central point with respect to the seat portion 15. These holes 18 are larger than the studs 12 in order that the position of the socket may be adjusted laterally in case the studs are not properly spaced or are inclined from their intended horizontal position.

The surface of each seat portion 15 is provided with sets of raised teeth or serrations 19 which extend from the hole 18 at right angles to each other and co-operate with corresponding serrations 20 on the surface of the washer 16 to prevent displacement of the washer with respect to the socket. A hole 21 is provided in the washer having approximately the same diameter as the stud 12, and when the nuts 17 are tigthened, the socket is locked in fixed position on the studs. In this manner the socket 13 may be adjusted either vertically or horizontally with respect to wall 11.

The inner surface 22 of the socket 13 is concave to accommodate the spherical outer portion 23 of the sleeve 24 which serves as a bearing for a shaft 25 extending across the tank. To avoid the use of a split socket, which by the inclusion of bolts or nuts, would provide surfaces for the collection and retention of settled matter, the socket 13 may be conveniently cast around the bearing sleeve, the spherical surface 23 being properly protected during casting to prevent adhesion. The inner surface of the bearing sleeve 24 may be babbitted or a graphite bushing 26 may be inserted into the bearing as illustrated in Fig. 3 and 4.

In order to prevent the sleeve 24 from turning in the socket member 13, a recess or groove 27 is provided in the socket preferably beneath the bearing and an extension or tongue 28 is raised on the outer surface of the bearing 24, which substantially fills the groove 27 and limits movement between the parts. To accomplish this the slot 27 is slightly wider and slightly deeper than the extension 28, which permit universal adjustment of the sleeve 24 to align it with the bearing on the opposite wall of the tank. The outer surface 29 of the extension 28 is generally in conformity with the conical surface 14 of the socket 13 and consequently there is a minimum surface for the collection of grease or putrescibles on the under side of the bearing. A suitable oil hole 30 may be formed through the extension 28 to lubricate the bearing surface whenever lubrication is required. When lubrication is not required the tongue 28 need not extend through the socket, the groove 27 in this case being shallower and wholly disposed on the inside of the socket.

By means of the invention described it is possible to mount each bearing on studs which may be displaced not only from their intended position with respect to one side of the tank, but also with respect to the studs on opposing sides of the tank. As a result, the shaft cooperating with the conveyor equipment may be easily disposed in alignment bearings, thus insuring better service and avoiding repair which, in the case of settling tanks, necessitates draining the tanks. In addition to the foregoing, a bearing is provided which prevents solids from settling and collecting on the bearing surface.

The invention having been described, what is claimed is:

In a vertical-walled settling tank for receiving a flowing stream of sewage or the like, a bearing arranged to lie flat against a side wall of the tank and having an outer surface which is frusto-conical and slopes at an angle of approximately forty-five degrees from the bearing axis, whereby putrescible matter carried by said stream may be shed from said bearing, and a rotatable horizontal shaft journalled in said bearing for operating mechanism in said tank.

PHILIP J. IMSE.
REGIS A. SEIDENSTRICKER.